Nov. 18, 1924.                                                        1,516,160
F. W. SPRINGER
LIQUID LEVEL GAUGE
Filed March 7, 1919
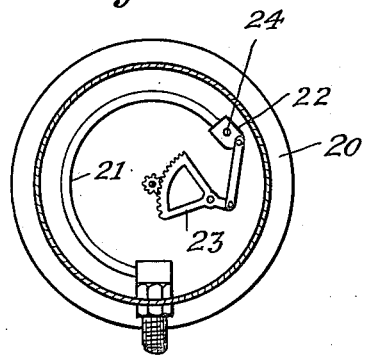
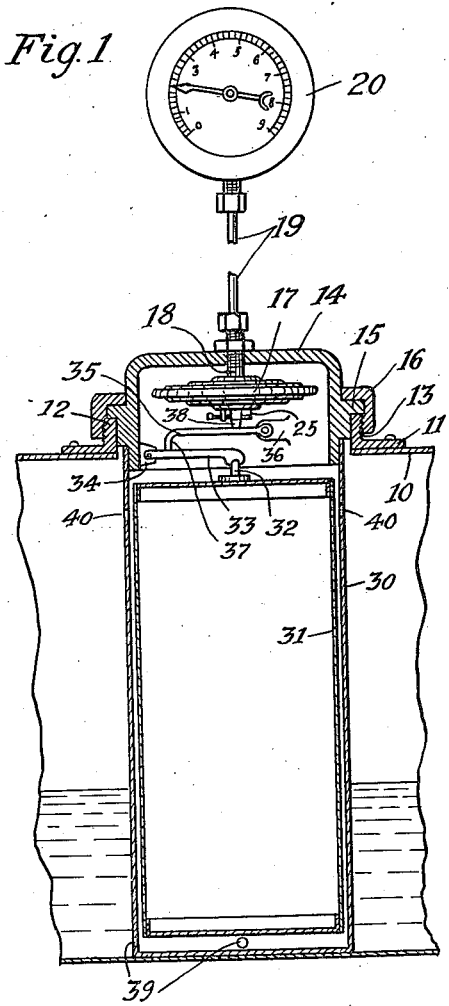
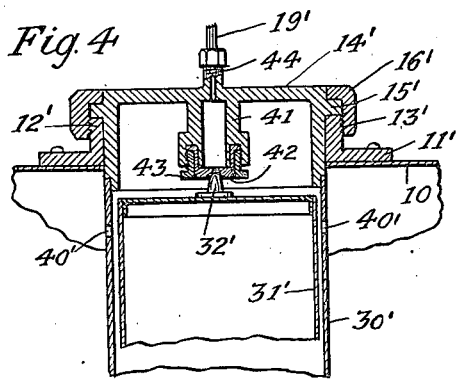
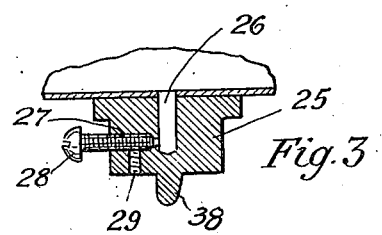
Inventor:
Franklin Wesley Springer Patented Nov. 18, 1924.

1,516,160

UNITED STATES PATENT OFFICE.

FRANKLIN WESLEY SPRINGER, OF MINNEAPOLIS, MINNESOTA.

LIQUID-LEVEL GAUGE.

Application filed March 7, 1919. Serial No. 281,233.

*To all whom it may concern:*

Be it known that I, FRANKLIN WESLEY SPRINGER, a citizen of the United States, residing at Minneapolis, in the county of Hennepin and the State of Minnesota, have invented a new and useful Improvement in Liquid-Level Gauges, of which the following is a specification.

My invention relates to gauges for fuel or "gasoline" tanks as used on automobiles and has for its objects to provide a fluid operated device for indicating the amount of gasoline in the gasoline tank in which the indicating member is remotely positioned from the tank proper. In carrying out my invention I employ an expansible member containing a fluid with a device adapted to vary the pressure of the fluid in accordance with the height of the gasoline in the tank and an indicating device remotely positioned from the tank and connected to the expansible member, said device being sensitive to differences in pressure of the fluid within the system caused by the expansible member.

The full objects and advantages of my invention will appear in the detailed description and are particularly pointed out in the claims.

In the drawings illustrating my invention, Fig. 1 is a vertical sectional view of a portion of a gasoline tank showing my invention applied thereto. Fig. 2 is a detail view of the indicating mechanism shown in Fig. 1. Fig. 3 is a sectional view of a portion of the expansible member shown in Fig. 1 drawn to a larger scale. Fig. 4 is a view similar to Fig. 1 of a modified form of the invention.

In Fig. 1 a portion of a gasoline tank 10 of an automobile is shown which may be cylindrical, ellipsoidal or prismatic in cross section as the case may be. For the particular form of the invention here shown the top of the tank is cut away and the opening formed, enclosed by a flange 11 provided with a lip 12, externally threaded at 13. A casting 14 is formed with a lip 15, by means of which and a recessed nut 16 said casting may be firmly held in place upon the tank 10.

Within casting 14, which is made hollow, an expansible member 17 of ordinary construction is mounted which has a neck 18 extending through the top of said casting. To this neck is secured a metallic tube 19 which is connected at its other end to a pressure gauge 20, preferably of the Bourdon type as is shown in Fig. 2 with the dial removed. The gauge 20, expansible member 17 and the connecting tubing 19 are all filled with a liquid which will not freeze or boil under normal temperatures. One such liquid which may be readily used is kerosene though a number of others form equally good substitutes. The device for filling the system is constructed as follows: The gauge 20 which is of usual construction includes a Bourdon tube 21 which has at its end a block 22 by means of which the indicating mechanism 23 is operated. Into this block is screwed a small screw 24 which when removed brings the interior of tube 21 into communication with the atmosphere. On the underside of the expansible member 17 as shown in Fig. 3 is secured a block 25 which has passageways 26 and 27 drilled in it at right angles to each other as shown, with passageway 26 communicating with the interior of the member. Hole 27 is also tapped and provided with a pointed screw 28 by means of which passageway 26 may be entirely closed. A third hole 29 is drilled in block 25 to meet hole 27 so that when screw 28 is partly out the interior of the expansible member is made to communicate with the atmosphere. The hole 29 is also tapped so that a pump not shown in the drawings may be screwed into it by means of which the liquid may be pumped into the system. The procedure for filling is as follows: Screw 28 is unscrewed sufficiently to uncover hole 29 and screw 24 is completely removed. The liquid is then pumped in thru hole 29, the air escaping thru the end of tube 21. When the whole system is filled both screws are tightened and the pump removed.

The principle involved in the operation of the device is as follows: When the block 25 is pressed upwards a pressure on the liquid within the expansible member 17 is exerted which causes the gauge 20 to register. By means of a float and other operating mechanism now to be explained the pressure in the expansible member is caused to vary in accordance with the height of the gasoline in the tank.

Upon the lower end of casting 14 is secured a tubular shell 30 closed at its lower end and extending from the top to the bottom of the gasoline tank 10. Within the same is positioned a float 31 slightly smaller than the interior bore thereof, which float may slide freely in a vertical direction. It is obvious that the shell 30 not only constitutes a guide for the float but protects the latter from being subjected to the wave motion set up in the gasoline contained in the tank when the automobile is being driven. If the float were subjected to this wave motion, the gauge would give a fluctuating indication instead of a true indication of the level of gasoline. A member 32 mounted on the top of this float bears against the end of a lever 33 pivoted on a fulcrum lug 34 cast on the interior of casting 14. A second lever 35 pivoted to a similar lug 36 has a fulcrum 37 formed on the end of it which bears upon the lever 33 near its point of pivot. Lever 35 is so positioned that a projection 38 on block 25 engages said lever near its point of pivot the same as lever 33.

The operation of the forenamed mechanism is as follows: Gasoline from the tank 10 enters the shell 30 thru preferably small apertures 39 and 40 in said shell causing float 31 to rise slowly and exert a force upon lever 33 which in turn multiplies the force until it reaches the expansible member 17 which as before explained operates gauge 20. As the height of gasoline in tank 10 increases the submersion of float 31 increases thereby increasing the force on member 17 and consequently causing the gauge to read higher. Gauge 20 can be calibrated to read in gallons as shown or simply indicate the part of the total capacity occupied by the gasoline in the tank. The restricted passages for the flow of gasoline or fuel thru the same cause the movement of the float 31 and consequently of the gauge proper to be damped so that fluctuations due to jar are not indicated.

The form of the invention shown in Fig. 4 differs from that shown in Fig. 1 in the following respects. Casting 14' is formed on its interior with a cup-shaped member 41 on the under side of which is mounted a flexible diaphragm 42 held in place thereon by means of a threaded bushing 43. This cup is connected with tube 19 and gauge 20 by means of a neck 44 formed integral with casting 14' and is hence filled with liquid the same as tube 19' and gauge 20. Fulcrum 32' bears directly upon this diaphragm and by making the area of the same small enough, sufficient pressure can be exerted to properly operate the indicating gauge.

The advantages of my invention are manifest. When my invention is applied to a motor vehicle and the indicating gauge mounted on the dash, the driver can at all times be informed as to the supply of gasoline on hand. Further the device is quite positive in its action and not apt to get out of order.

I claim:

1. In combination with a receptacle for liquids, a cap attached at an opening in the top wall of said receptacle, a fluid container located within said cap, said container having a flexible wall, a tube extending through said cap from said container, a gauge to which said tube leads, a shell extending between said cap and the bottom of said receptacle, said shell having small apertures at its top and bottom, a float having vertical walls fitting slidably within said shell, a lever pivoted to the inner wall of said cap, the free end of said lever being engaged by the top of said float, a second lever pivoted to the inner wall of said cap, the free end of said second lever engaging the upper side of said first lever near the pivoted end thereof, and a projection on the flexible wall of said liquid container in engagement with the upper side of said second lever near the pivoted end thereof.

2. In combination with a receptacle for liquids, a fluid container mounted at the top of said receptacle, said container having a flexible wall at the lower end thereof, a single tube extending from said container, a gauge to which said tube leads, a tubular guide extending from top to bottom of said receptacle, an elongated float having vertical walls fitting slidably within said guide so that the latter protects the float from wave motion of the liquid in said receptacle, said float having a length nearly equal to the height of said receptacle, and means carried by the upper end of said float for transmitting the upward thrust to said flexible wall exerted by the float when partially submerged in the liquid.

3. In combination with a receptacle for liquids, a fluid container mounted at the upper portion of said receptacle, said container having a flexible wall, a pressure gauge, a tube connecting said pressure gauge and said fluid container, a shell extending vertically of said receptacle, a float enclosed by said shell so as to be capable of vertical movement therein and which is protected thereby from the wave motion of the liquid in said receptacle, said shell having a small orifice opening into said receptacle to allow liquid to flow slowly into and out of said shell, and means operated by said float for transmitting the upward thrust to said flexible wall exerted by the float when partially submerged in the liquid.

4. In combination with a receptacle for liquid, a fluid container mounted at the top of said receptacle, said container having a flexible wall at the lower end thereof, a single tube extending from said container, a gauge to which said tube leads, a guide extending from top to bottom of said receptacle, an elongated float having vertical walls fitting slidably within said guide so that the latter protects the float from wave motion of the liquid in said receptacle, said float having a length nearly equal to the height of said receptacle, and lever connections interposed between the top of said float and said lower flexible wall whereby the upward thrust transmitted to the latter by said float is multiplied.

FRANKLIN WESLEY SPRINGER.